United States Patent
Singh et al.

(10) Patent No.: US 10,594,618 B1
(45) Date of Patent: Mar. 17, 2020

(54) APPARATUS, SYSTEM, AND METHOD FOR FRAGMENTING PACKETS INTO SEGMENTS THAT COMPLY WITH THE MAXIMUM TRANSMISSION UNIT OF EGRESS INTERFACES

(71) Applicant: Juniper Networks, Inc., Sunnyvale, CA (US)

(72) Inventors: Prashant Singh, Santa Clara, CA (US); Sreekanth Rupavatharam, Campbell, CA (US); Hariprasad Shanmugam, Kanata (CA); Erin C. MacNeil, Carp (CA)

(73) Assignee: Juniper Networks, Inc, Sunnyvale, CA (US)

( * ) Notice: Subject to any disclaimer, the term of this patent is extended or adjusted under 35 U.S.C. 154(b) by 375 days.

(21) Appl. No.: 15/615,016

(22) Filed: Jun. 6, 2017

(51) Int. Cl.
*H04L 12/805* (2013.01)
*H04L 12/861* (2013.01)
*H04L 12/935* (2013.01)
*H04L 29/06* (2006.01)
*H04L 12/879* (2013.01)
*H04L 12/841* (2013.01)

(52) U.S. Cl.
CPC ........ *H04L 47/365* (2013.01); *H04L 49/3072* (2013.01); *H04L 49/90* (2013.01); *H04L 47/283* (2013.01); *H04L 49/901* (2013.01); *H04L 69/22* (2013.01)

(58) Field of Classification Search
CPC ... H04L 47/365; H04L 49/3072; H04L 49/90; H04L 47/283; H04L 49/901; H04L 69/22
See application file for complete search history.

(56) References Cited

U.S. PATENT DOCUMENTS

| | | | | |
|---|---|---|---|---|
| 7,471,681 B2* | 12/2008 | Jason | ...................... | H04L 47/10 370/392 |
| 8,463,860 B1* | 6/2013 | Guruswamy | ........... | H04L 43/50 707/602 |
| 8,547,974 B1* | 10/2013 | Guruswamy | ........... | H04L 43/50 370/389 |
| 8,612,530 B1* | 12/2013 | Sapovalovs | ............. | H04L 43/50 707/602 |
| 9,794,169 B2* | 10/2017 | Tie | ......................... | H04L 45/306 |
| 10,419,356 B1* | 9/2019 | Singh | ...................... | H04L 47/26 |
| 10,419,357 B1* | 9/2019 | Bhatta | ................... | H04L 47/365 |
| 2004/0105438 A1* | 6/2004 | Moon | ..................... | H04L 45/00 370/389 |

(Continued)

*Primary Examiner* — Daniel C. Murray
(74) *Attorney, Agent, or Firm* — FisherBroyles, LLP

(57) ABSTRACT

The disclosed apparatus may include (1) a physical routing engine that comprises (A) a socket-intercept layer, stored in kernel space, that (I) intercepts a packet that is destined for a remote device and (II) queries, in response to intercepting the packet in kernel space, a routing daemon in user space for an MTU value of an egress interface that is to forward the packet from the network device to the remote device and (B) a tunnel driver, stored in kernel space, that fragments the packet into segments whose respective sizes each comply with the MTU value of the egress interface and (2) a physical packet forwarding engine that forwards the segments of the packet to the remote device by way of the egress interface. Various other apparatuses, systems, and methods are also disclosed.

14 Claims, 6 Drawing Sheets

(56) References Cited

U.S. PATENT DOCUMENTS

| | | | | |
|---|---|---|---|---|
| 2007/0171828 A1* | 7/2007 | Dalal | H04L 47/10 | 370/235 |
| 2008/0101237 A1* | 5/2008 | Ogura | H04L 43/00 | 370/235 |
| 2008/0159150 A1* | 7/2008 | Ansari | H04L 45/00 | 370/238 |
| 2008/0298258 A1* | 12/2008 | Susilo | H04L 41/12 | 370/248 |
| 2010/0002697 A1* | 1/2010 | Krishnan | H04L 12/1836 | 370/390 |
| 2010/0054251 A1* | 3/2010 | Lee | H04L 12/4641 | 370/392 |
| 2010/0067540 A1* | 3/2010 | Park | H04L 49/3072 | 370/419 |
| 2010/0183009 A1* | 7/2010 | Baratakke | G06F 9/5077 | 370/392 |
| 2010/0265944 A1* | 10/2010 | Gao | H04L 1/1867 | 370/389 |
| 2011/0271096 A1* | 11/2011 | Bharrat | H04L 63/0485 | 713/153 |
| 2011/0271097 A1* | 11/2011 | Joachimpillai | H04L 63/0485 | 713/153 |
| 2012/0284396 A1* | 11/2012 | Vicat-Blanc Primet | H04L 47/10 | 709/224 |
| 2014/0233565 A1* | 8/2014 | Mahapatra | H04L 45/74 | 370/392 |
| 2014/0317276 A1* | 10/2014 | Tie | H04L 45/306 | 709/224 |
| 2014/0369210 A1* | 12/2014 | Doyle | H04L 47/365 | 370/252 |
| 2015/0081863 A1* | 3/2015 | Garg | H04L 41/00 | 709/223 |
| 2015/0098469 A1* | 4/2015 | Chudgar | H04L 47/41 | 370/392 |
| 2015/0117452 A1* | 4/2015 | Mosko | H04L 47/365 | 370/392 |
| 2015/0288603 A1* | 10/2015 | Kandasamy | H04L 45/74 | 370/392 |
| 2016/0234101 A1* | 8/2016 | Sundar | H04L 47/365 | |
| 2016/0380902 A1* | 12/2016 | Sreeramoju | H04L 47/36 | 370/401 |
| 2017/0019344 A1* | 1/2017 | Przygienda | H04L 45/586 | |
| 2017/0302584 A1* | 10/2017 | Raj | H04L 12/6418 | |
| 2017/0331755 A1* | 11/2017 | Gao | H04L 12/413 | |
| 2018/0205629 A1* | 7/2018 | Xue | H04L 47/36 | |
| 2019/0045562 A1* | 2/2019 | Liu | H04W 76/10 | |

* cited by examiner

APPARATUS, SYSTEM, AND METHOD FOR FRAGMENTING PACKETS INTO SEGMENTS THAT COMPLY WITH THE MAXIMUM TRANSMISSION UNIT OF EGRESS INTERFACES

BACKGROUND

Network devices may include various interfaces that have differing Maximum Transmission Units (MTUs). In this context, the MTU may represent and/or refer to the size of the largest packet capable of being transmitted via a certain interface. For example, a network device may include an internal interface that connects the routing engine to the packet forwarding engine and an egress interface that connects the packet forwarding engine of the network device to the packet forwarding engine of a remote device. In this example, the internal and egress interfaces may represent portions of a path by which packets traverse from the network device to the remote device.

The internal and egress interfaces may have different MTUs. As a specific example, the internal interface between the routing engine and the packet forwarding engine may have an MTU of 9000 bytes, and the egress interface between the packet forwarding engine of the network device and the packet forwarding engine of the remote device may have an MTU of 1500 bytes. As a result, packets travelling from the network device to the remote device along this path may need to include 1500 bytes or less.

Packet size is often determined and/or controlled by the operating system kernel of the routing engine within the network device. For example, an application running on the routing engine may issue a packet that is destined for the remote device and then pass the packet to the operating system kernel of the routing engine to facilitate the transfer to the remote device. In this example, when received by the operating system kernel, the packet may include 9000 bytes even though the egress interface has an MTU of only 1500 bytes. As a result, the operating system kernel may need to fragment the packet into smaller segments of 1500 bytes or less before the packet is able to successfully transfer from the network device to the remote device.

Unfortunately, in some scenarios and/or configurations, traditional operating system kernels may be unaware of the MTUs of certain interfaces. For example, the operating system kernel described above may be unaware that the MTU of the egress interface is 1500 bytes. As a result, the operating system kernel may pass the 9000-byte packet to the packet forwarding engine of the network device via the internal interface without ever fragmenting the packet into 1500-byte segments. The packet forwarding engine may be unable to forward the 9000-byte packet to the remote device via the egress interface due to the packet size exceeding the egress interface's MTU. Consequently, the transfer of this packet may fail.

The instant disclosure, therefore, identifies and addresses a need for additional and improved apparatuses, devices, and methods for fragmenting packets into segments that comply with the MTU of egress interfaces.

SUMMARY

As will be described in greater detail below, the instant disclosure generally relates to apparatuses, systems, and methods for fragmenting packets into segments that comply with the MTU of egress interfaces. In one example, an apparatus for accomplishing such a task may include (1) a physical routing engine that comprises (A) a socket-intercept layer, stored in kernel space, that (I) intercepts a packet that is destined for a remote device and (II) queries, in response to intercepting the packet in kernel space, a routing daemon in user space for an MTU value of an egress interface that is to forward the packet from the network device to the remote device and (B) a tunnel driver, stored in kernel space, that fragments the packet into segments whose respective sizes each comply with the MTU value of the egress interface and (2) a physical packet forwarding engine that forwards the segments of the packet to the remote device by way of the egress interface.

Similarly, a network device incorporating the above-described apparatus may include (1) a physical routing engine that comprises (A) a socket-intercept layer, stored in kernel space, that (I) intercepts a packet that is destined for a remote device and (II) queries, in response to intercepting the packet in kernel space, a routing daemon in user space for an MTU value of an egress interface that is to forward the packet from the network device to the remote device and (B) a tunnel driver, stored in kernel space, that fragments the packet into segments whose respective sizes each comply with the MTU value of the egress interface and (2) a physical packet forwarding engine that forwards the segments of the packet to the remote device by way of the egress interface.

A corresponding method may include (1) intercepting, via a socket-intercept layer in kernel space on a network device, a packet that is destined for a remote device and then, in response to intercepting the packet in kernel space, (2) querying, by the socket-intercept layer, a routing daemon in user space on the network device for an MTU value of an egress interface that is to forward the packet from the network device to the remote device, (3) fragmenting the packet into segments whose respective sizes each comply with the MTU value of the egress interface, and then (4) forwarding the segments of the packet to the remote device by way of the egress interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
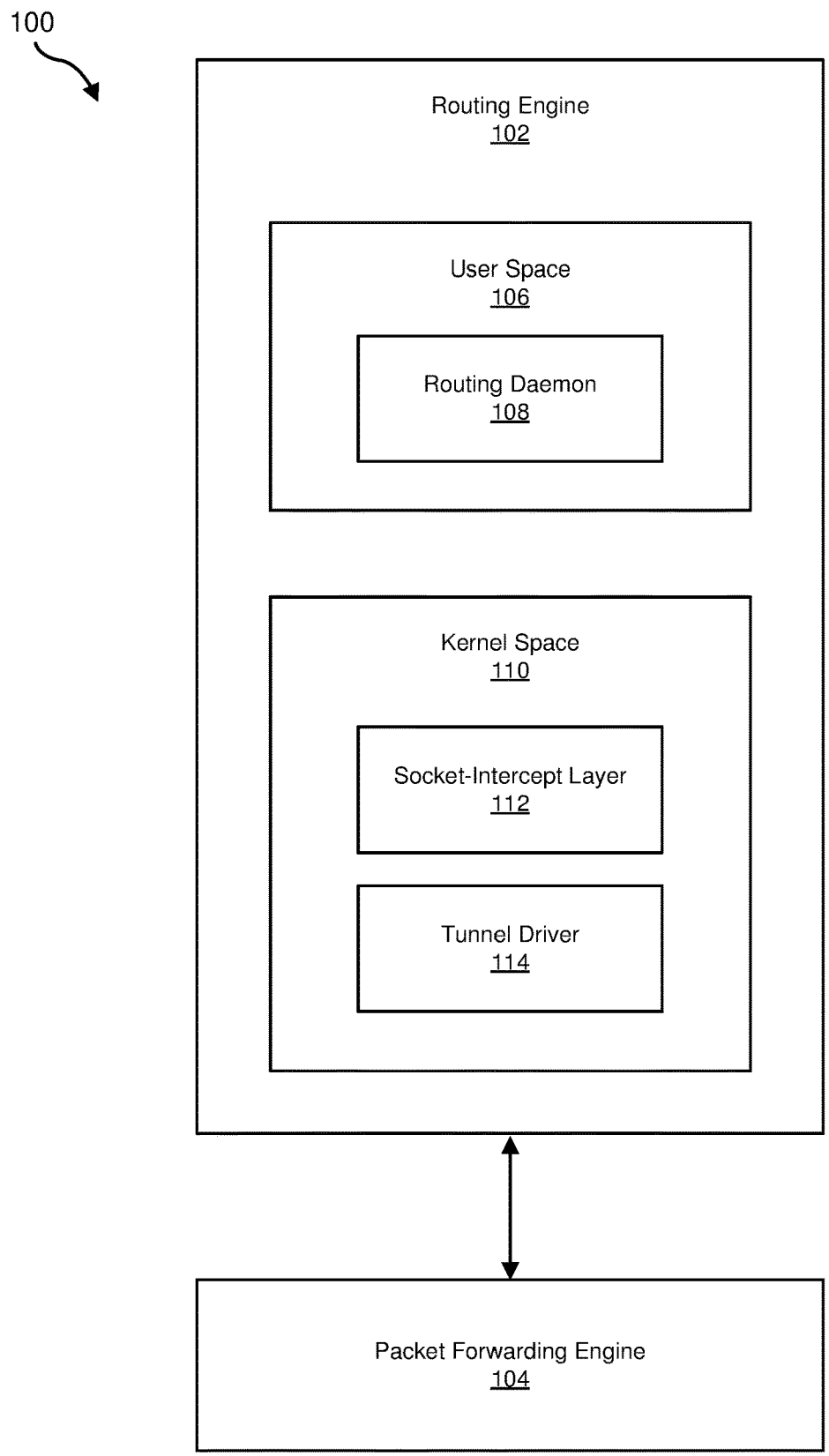
FIG. 1 is a block diagram of an exemplary apparatus for fragmenting packets into segments that comply with the MTU of egress interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for fragmenting packets into segments that comply with the MTU of egress interfaces. As will be explained in greater detail below, embodiments of the instant disclosure may involve and/or provide a routing daemon that runs in user space on a network device and records and/or keeps track of the MTUs of various interfaces on the network device. In addition, embodiments of the instant disclosure may involve and/or provide a socket-intercept layer that runs in kernel space on the network device and intercepts packets that are destined to egress out of the network device. Embodiments of the instant disclosure may further involve and/or provide a tunnel driver that runs in kernel space on the network device and fragments the intercepted packets into segments whose sizes comply with the MTUs of the egress interfaces responsible for forwarding such packets.

In one example, upon intercepting a specific packet, the socket-intercept layer may query the routing daemon for the MTU value of the egress interface out of which that packet is to egress from the network device toward the packet's destination. In response to this query, the routing daemon may provide the socket-interface layer with the MTU value of that egress interface. The socket-interface layer may record the MTU value of that egress interface as metadata within the packet and then pass the packet to the tunnel driver for fragmentation, if necessary, in compliance with that MTU value.

In this example, upon receiving the packet, the tunnel driver may identify the size of the packet and fragment the packet into segments whose sizes are each less than or equal to the MTU value of the egress interface. The tunnel driver may then push the segments of the packet to a packet forwarding engine on the network device. In turn, the packet forwarding engine may forward the segments of the packet to the corresponding destination via the egress interface.

The following will provide, with reference to FIG. 1, examples of apparatuses for fragmenting packets into segments that comply with MTUs of egress interfaces. The discussions corresponding to FIGS. 2 and 4 will describe exemplary implementations of apparatuses that facilitate fragmenting packets into segments that comply with MTUs of egress interfaces. The discussion corresponding to FIG. 3 will describe an exemplary method for fragmenting packets into segments that comply with MTUs of egress interfaces. The discussion corresponding to FIG. 5 will describe an exemplary packet, an exemplary socket buffer, and exemplary packet segments. Finally, the discussion corresponding to FIG. 6 will provide numerous examples of systems that may incorporate the apparatus from FIG. 1.

FIG. 1 shows an exemplary apparatus 100 that facilitates fragmenting packets into segments that comply with the MTU of egress interfaces. As illustrated in FIG. 1, apparatus 100 may include and/or represent a routing engine 102 and a packet forwarding engine 104 in communication with one another. In this example, routing engine 102 may include a routing daemon 108 running in user space 106. Additionally or alternatively, routing engine 102 may include a socket-intercept layer 112 and a tunnel driver 114 that both run in kernel space 110.

Routing engine 102 generally represents and/or refers to a physical device and/or hardware that handles routing procedures, processes, and/or decisions. Routing engine 102 may include one or more Application-Specific Integrated Circuits (ASICs) and/or physical processors. Examples of such processors include, without limitation, microprocessors, microcontrollers, Central Processing Units (CPUs), Field-Programmable Gate Arrays (FPGAs) that implement softcore processors, portions of one or more of the same, variations or combinations of one or more of the same, and/or any other suitable physical processors.

In one example, routing engine 102 may control certain physical and/or virtual interfaces of a network device. In addition, routing engine 102 may include an operating system and/or certain applications that facilitate communication between the network device and other devices within a network.

Packet forwarding engine 104 generally represents and/or refers to a physical device and/or hardware that processes packets by forwarding the same between input and output interfaces. Packet forwarding engine 104 may include one or more ASICs and/or physical processors. Examples of such processors include, without limitation, microprocessors, microcontrollers, CPUs, FPGAs that implement softcore processors, portions of one or more of the same, variations or combinations of one or more of the same, and/or any other suitable physical processors.

In one example, packet forwarding engine 104 may include one or more egress interfaces (not explicitly illustrated in FIG. 1) out of which packets egress from the network device to the other devices within the network. Additionally or alternatively, packet forwarding engine 104 may include one or more ingress interfaces (not explicitly illustrated in FIG. 1) into which packets ingress to the network device from the other devices within the network.

In one example, routing engine 102 and packet forwarding engine 104 may be communicatively coupled and/or connected to one another via an interface that is internal to the network device. Accordingly, apparatus 100 may represent a portion of and/or be included in the network device. However, the network device may also include various other components in addition to and/or beyond those represented as and/or included in apparatus 100.

The term "user space," as used herein, generally refers to any type or form of memory and/or address space that has been designated for and/or allocated to application software and/or components. The term "kernel space," as used herein, generally refers to any type or form of memory and/or address space that has been designated for and/or allocated to an operating system kernel and/or operating system components. In one example, user space 106 and kernel space 110 may include and/or represent mutually exclusive virtual memory allocations and/or execution contexts that are separate and/or segregated from one another.

Routing daemon 108 generally represents and/or refers to a program, module, and/or component that manages and/or maintains certain state of a network device. In one example, routing daemon 108 may manage and/or maintain a routing table and/or routing information base for the network device. Additionally or alternatively, routing daemon 108 may manage and/or maintain information that identifies the MTUs of certain interfaces (such as egress interfaces) on the network device. For example, routing daemon 108 may subscribe to information that identifies the MTUs of egress interfaces out of which traffic egresses from the network device to other devices within the network.

Socket-intercept layer 112 generally represents and/or refers to a program, module, and/or component that receives, hijacks, and/or intercepts traffic crossing from user space into kernel space on a network device. In one example, socket-intercept layer 112 may query routing daemon 108 in user space 106 for MTUs of egress interfaces that facilitate forwarding traffic from the network device to other devices. This querying may take place and/or occur dynamically as packets are received and/or intercepted by socket-interface layer 112.

Tunnel driver 114 generally represents and/or refers to a program, module, and/or component that ensures outgoing packets comply with the MTUs of the corresponding egress interfaces. In one example, tunnel driver 114 may fragment packets into segments whose respective sizes each comply with the MTUs of the corresponding egress interfaces. The phrase "to comply with," as used herein in connection with the MTU of an egress interface, generally refers to the size of a packet or segment being less than or equal to the MTU of that egress interface.

Accordingly, packets or segments whose respective sizes are less than or equal to the MTUs of the corresponding egress interfaces may comply with those MTUs. Compliant packets or segments may be able to egress out of the corresponding egress interfaces. In contrast, noncompliant packets or segments may be unable to egress out of the corresponding egress interfaces. As a result, noncompliant packets or segments may be dropped by packet forwarding engine 104 and/or the corresponding egress interfaces. In other words, transmissions involving noncompliant packets or segments may fail.

Figure 2:
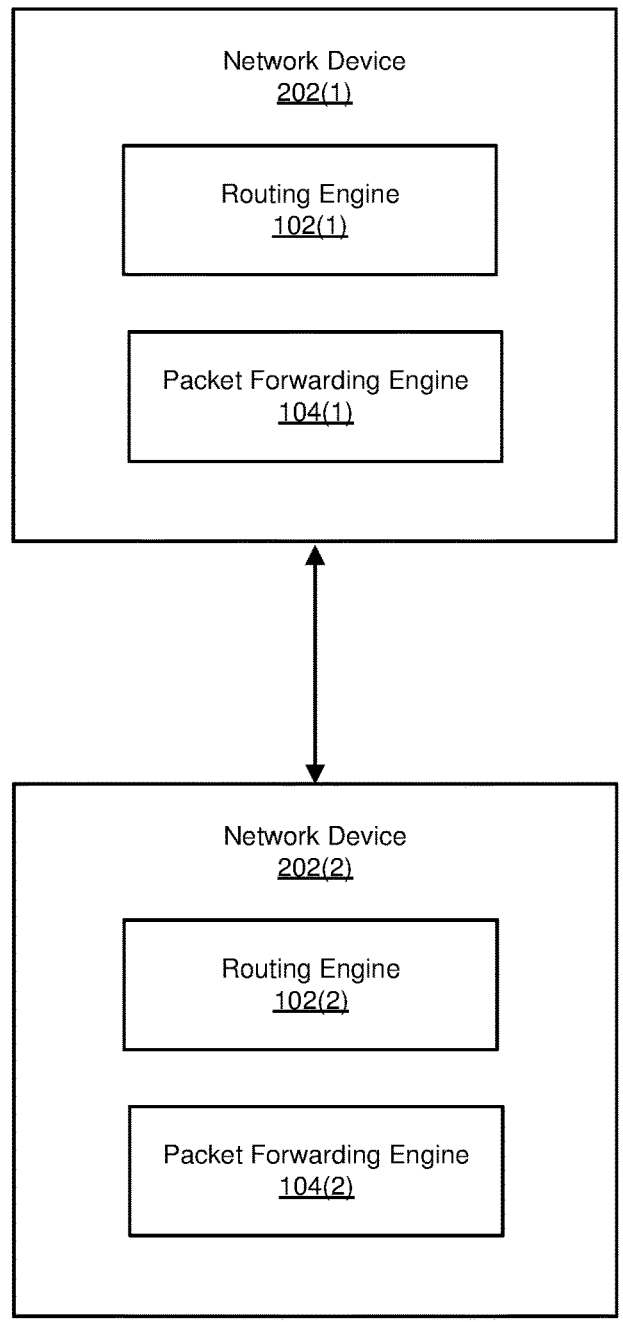
FIG. 2 is a block diagram of an exemplary implementation of an apparatus for fragmenting packets into segments that comply with the MTU of egress interfaces.

Apparatus 100 in FIG. 1 may be implemented in a variety of ways. For example, all or a portion of apparatus 100 may represent portions of exemplary implementation system 200 in FIG. 2. FIG. 2 shows an exemplary implementation 200 of an apparatus that fragments packets into segments that comply with the MTU of egress interfaces. As illustrated in FIG. 2, implementation 200 may include and/or represent network devices 202(1) and 202(2) in communication with one another. In this example, network device 202(1) may include routing engine 102(1) and packet forwarding engine 104(1) in communication with one another via an internal interface (not explicitly illustrated in FIG. 2). In addition, network device 202(2) may include routing engine 102(2) and packet forwarding engine 104(2) in communication with one another via an internal interface (not explicitly illustrated in FIG. 2).

Network devices 202(1) and 202(2) each generally represent a physical computing device that forwards traffic within a network and/or across networks. In one example, one or more of network devices 202(1) and 202(2) may include and/or represent a router, such as a Customer Edge (CE) router, a Provider Edge (PE) router, a hub router, a spoke router, an Autonomous System (AS) boundary router, and/or an area border router. Additional examples of network devices 202(1) and 202(2) include, without limitation, switches, hubs, modems, bridges, repeaters, gateways, portions of one or more of the same, combinations or variations of one or more of the same, and/or any other suitable network devices. Although FIG. 2 illustrates only two network devices, other embodiments may involve and/or incorporate various additional network devices.

In some examples, network devices 202(1) and 202(2) may be directly linked to one another such that they each represent the next hop of the other. In other examples, network devices 202(1) and 202(2) may be separated from one another by one or more intermediary devices (not illustrated in FIG. 2). In other words, intermediary devices may reside between network devices 202(1) and 202(2) and/or facilitate communication between network devices 202(1) and 202(2). Accordingly, implementation 200 may include additional network devices and/or components that are not necessarily illustrated in FIG. 2.

Figure 3:
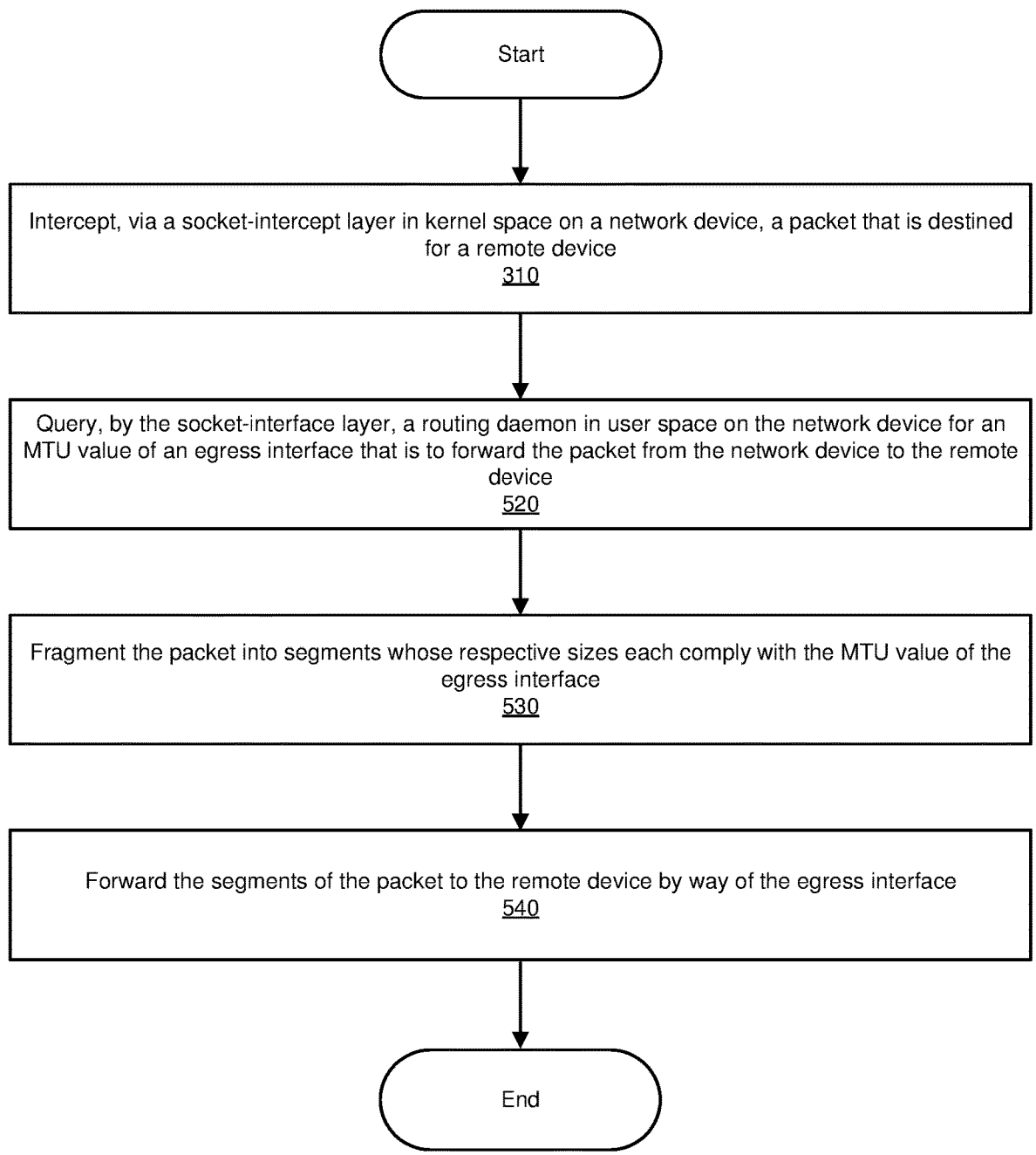
FIG. 3 is a flow diagram of an exemplary method for fragmenting packets into segments that comply with the MTU of egress interfaces.

FIG. 3 is a flow diagram of an exemplary computer-implemented method 300 for fragmenting packets into segments that comply with the MTU of egress interfaces. The steps shown in FIG. 3 may be performed by any suitable computer-executable code, computing system, and/or ASIC, including apparatus 100 in FIG. 1, implementation 200 in FIG. 2, exemplary implementation 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may intercept, in kernel space on a network device, a packet that is destined for a remote device. For example, socket-intercept layer 112 may, as part of routing engine 102(1) on network device 202(1) in FIG. 2, intercept a packet that is destined for network device 202(2) in FIG. 2. In this example, socket-intercept layer 112 may reside, operate, and/or run in kernel space on network device 202(1).

The systems described herein may perform step 310 in a variety of different ways and/or contexts. In some examples, socket-intercept layer 112 may receive, hijack, and/or intercept a packet that originated from an application in user space (not illustrated in FIG. 2) on routing engine 102(1). For example, socket-intercept layer 112 may monitor traffic that passes and/or crosses from user space to kernel space on routing engine 102(1). In this example, an application in user space on network device 202(1) may bind to tunnel driver 114 in kernel space on network device 202(1). By binding to tunnel driver 114 in this way, the application may create a network socket that facilitates communication between the application and another application on network device 202(2). This network socket may include and/or represent one endpoint of a two-way communication link between applications running on different devices.

Upon creation of the network socket, the application in user space on network device 202(1) may generate a packet and then send the same from user space to kernel space. In other words, the application may push and/or pass the packet to the operating system kernel on network device 202(1) for transmission to network device 202(2). In this example, the packet may be destined for the other application on network device 202(2). As the packet enters kernel space, socket-intercept layer 112 may be monitoring traffic pushed and/or passed to the operating system kernel. Accordingly, while monitoring such traffic, socket-intercept layer 112 may receive, hijack, and/or intercept the packet.

Returning to FIG. 3, at step 320 one or more of the systems described herein may query a routing daemon in user space on the network device for an MTU value of an egress interface that is to forward the packet from the network device to the remote device. For example, socket-intercept layer 112 may, as part of routing engine 102(1) on network device 202(1) in FIG. 2, query routing daemon 108 in user space on network device 202(1) for an MTU value of the egress interface that is to forward the packet from network device 202(1) to network device 202(2). In this example, the egress interface may include and/or represent a physical component of packet forwarding engine 104(1). The packet may be configured and/or intended to pass through and/or egress out of the egress interface on the way to network device 202(2).

The systems described herein may perform step 320 in a variety of different ways and/or contexts. In some examples, socket-intercept layer 112 may identify the egress interface corresponding to the packet based at least in part on the packet's metadata. Upon identifying the egress interface, socket-intercept layer 112 may generate a query that requests the MTU value of that egress interface. Socket-intercept layer 112 may then send and/or submit this query to routing daemon 108 in user space on routing engine 102(1).

In this example, routing daemon 108 may have access to the MTU value of the egress interface by subscribing to the network interfaces on network device 202(1) and/or the corresponding route information. In response to the query, routing daemon 108 may provide socket-intercept layer 112 with the MTU value of the egress interface out of which the packet is to egress from network device 202(1) to network device 202(2). Upon receiving the MTU value of the egress interface from routing daemon 108, socket-interface layer 112 may record that MTU value as metadata of the packet. For example, socket-interface layer 112 may add the MTU value to a header (such as a control message or "CMSG" header) of the packet. Socket-interface layer 112 may then push, pass, and/or forward the packet to tunnel driver 114 in kernel space on routing engine 102(1) for fragmentation. By doing so, socket-interface layer 112 may ensure that the packet is fragmented prior to being forwarded to network device 202(2) by way of the egress interface.

Returning to FIG. 3, at step 330 one or more of the systems described herein may fragment the packet into segments whose respective sizes each comply with the MTU value of the egress interface. For example, tunnel driver 114 may, as part of routing engine 102(1) on network device 202(1) in FIG. 2, fragment the packet into segments whose respective sizes each comply with the MTU value of the egress interface. In this example, the size of the packet and/or each segment may be measured in units of digital information (such as bits, bytes, etc.). The size of each segment may comply with the MTU value by being less than or equal to the MTU value.

The systems described herein may perform step 330 in a variety of different ways and/or contexts. In some examples, tunnel driver 114 may divide the packet into multiple segments that each include a portion of the original packet. In one example, tunnel driver 114 may identify and/or determine the size of the packet. For example, tunnel driver 114 may identify and/or determine the number of bits and/or bytes of data included in the packet. Tunnel driver 114 may then determine that the size of the packet exceeds the MTU value of the egress interface.

In response to this determination, tunnel driver 114 may call and/or invoke a fragmentation routine that fragments the packet into segments based at least in part on the MTU value. For example, the fragmentation routine may divide the packet into smaller segments whose sizes are each less than or equal to the MTU value. In one example, tunnel driver 114 may then add a header to each of the segments of the packet. This header may direct each of the segments to packet forwarding engine 104(1) on network device 202(1). In other words, this header may indicate, to the operating system kernel of routing engine 102(1), that the packet segments are to arrive at and/or reach packet forwarding engine 104(1).

In one example, tunnel driver 114 may then push, pass, and/or forward the packet segments to or toward packet forwarding engine 104(1) on network device 202(1). Additionally or alternatively, the operating system kernel of routing engine 202(1) may direct the packet segments to packet forwarding engine 104(1) on network device 202(1) in accordance with their headers that identify packet forwarding engine 104(1) as the segments' intermediate destination or target.

In some examples, one or more of the systems described herein may record the MTU value of the egress interface for future reference to facilitate bypassing the query to routing daemon 108 in connection with subsequent packets that are destined for the other application on network device 202(2). For example, tunnel driver 114 may, as part of routing engine 102(1) on network device 202(1) in FIG. 2, record the MTU value of the egress interface in a socket buffer (e.g., LINUX's "skbuff" data structure) of the network socket. As described above, the network socket may represent one endpoint of the communication link between the application from which the packet originated on network device 202(1) and the other application running on network device 202(N).

Additionally or alternatively, certain hooks may, as part of one or more message functions in the operating system kernel of routing engine 102(1), record the MTU value of the egress interface in the socket buffer of the network socket. For example, LINUX send message functions may be modified to include hooks that process one or more of the headers added by tunnel driver 114 to the packet segments. During this processing, the hooks may identify the MTU value of the corresponding egress interface out of which the packet segments are to egress from network device 202(1) to network device 202(2). The hooks may then record the MTU value of the egress interface in the socket buffer of the network socket.

Once the MTU value is recorded in the socket buffer, the MTU value may persist throughout the kernel network stack. As a result, tunnel driver 114 may be able to reference that MTU value via the socket buffer when fragmenting any subsequent packets that are configured and/or destined for transmission by way of the network socket. In doing so, tunnel driver 114 may be able to ensure that none of these packets or their constituent segments are dropped or lead to a transmission failure due to the transmission-size limit of the egress interface.

In some examples, the path of the packet and/or its constituent segments may include multiple interfaces. In many cases, these interfaces may have differing MTUs. For example, routing engine 102(1) and packet forwarding engine 104(1) may be communicatively coupled to one another via an interface that is internal to network device 202(1). In one example, this internal interface may have an MTU that is greater than the egress interface's MTU. In this example, the operating system kernel may include and/or have access to information that identifies the MTU of the internal interface between routing engine 102(1) and packet forwarding engine 104(1).

In one example, tunnel driver 114 may identify the MTU value of the internal interface via this information. In this example, tunnel driver 114 may determine that the MTU value of the internal interface is greater than the MTU value of the egress interface. In response to this determination, tunnel driver 114 may fragment the packet such that the size of each resulting packet segment is less than or equal to the MTU value of the egress interface irrespective of the MTU value of the internal interface. In other words, tunnel driver 114 may fragment the packet such that the resulting packet segments comply with both the internal interface and the egress interface. Put differently, tunnel driver 114 may use the smallest MTU value of the interfaces that form the path of the packet as the size limit for the segments created during fragmentation.

Returning to FIG. 3, at step 340 one or more of the systems described herein may forward the segments of the packet to the remote device by way of the egress interface. For example, packet forwarding engine 104(1) may, as part of network device 202(1) in FIG. 2, forward the segments of the packet to network device 202(2) by way of the egress interface. In this example, the segments may each include a portion of the information and/or message from the original packet. Additionally or alternatively, the segments may collectively include and/or contain the same information and/or message as the original packet. These segments may themselves represent smaller stand-alone packets destined for network device 202(2).

The systems described herein may perform step 340 in a variety of different ways and/or contexts. In some examples, packet forwarding engine 104(1) may push and/or send the segments out of the egress interface on network device 202(1) toward network device 202(2). Accordingly, these segments may egress out of network device 202(1) by way of the egress interface whose MTU value was queried from routing daemon 108.

As these segments arrive at network device 202(2), packet forwarding device 104(2) may receive these segments by way of an ingress interface. Packet forwarding engine 104(2) may then push and/or pass these segments to the other application running in routing engine 102(2) for processing and/or consumption. The other application may have established another network socket on network device 202(2). This other network socket may include and/or represent the other endpoint of the two-way communication link described above.

In some examples, socket-intercept layer 112 and/or tunnel driver 114 may receive and/or intercept another packet from the application running in user space on routing engine 102(1) of network device 202(1). In such examples, this other packet may be destined for the other application running on network device 202(2) by way of the same network socket. Tunnel driver 114 may then identify the MTU value of the egress interface corresponding to that network socket as recorded and/or stored in the socket buffer of that network socket.

In one example, tunnel driver 114 may fragment this other packet into multiple segments in accordance with the record of the egress interface's MTU identified in the socket buffer. The size of each of these segments may comply with the egress interface's MTU to ensure that their transmission does not fail due to the size limit of the egress interface. Tunnel driver 114 and/or the operating system kernel may push and/or pass these segments from routing engine 102(1) to packet forwarding engine 104(1). Packet forwarding engine 104(1) may then forward these segments to network device 202(2) by way of the egress interface.

Figure 4:
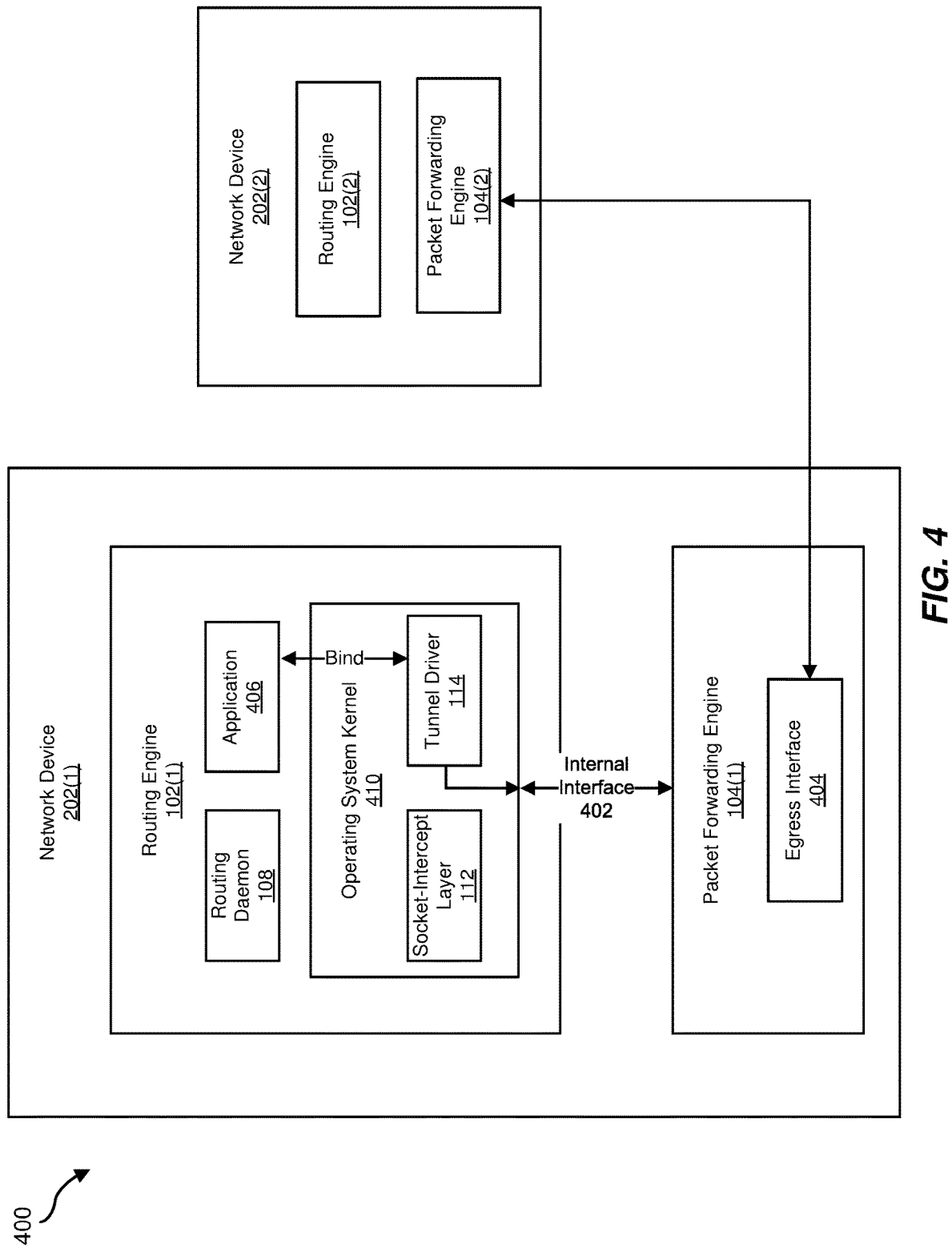
FIG. 4 is a block diagram of an exemplary implementation of an apparatus for fragmenting packets into segments that comply with the MTU of egress interfaces.

FIG. 4 illustrates an exemplary implementation 400 of an apparatus for fragmenting packets into segments that comply with the MTU of egress interfaces. As illustrated in FIG. 4, implementation 400 may include network devices 202(1) and 202(2), which are communicatively coupled to one another. In one example, network device 202(1) may include an application 406 running in user space on routing engine 102(1). As a specific example, application 406 may include and/or represent a Border Gateway Protocol (BGP) instance and/or process. In this example, application 406 in FIG. 4 may bind to tunnel driver 114 running in an operating system kernel 410 on routing engine 102(1). By binding to tunnel driver 114 in this way, application 406 may create and/or establish a socket that facilitates communication between application 406 and another application (not illustrated in FIG. 4) that is running in user space on network device 202(2).

As further illustrated in FIG. 4, network device 202(1) may include an egress interface 404 on packet forwarding engine 104(1). In one example, the socket created and/or established by application 406 may direct outgoing traffic to egress interface 404 in FIG. 4. Accordingly, all traffic transmitted via the socket may egress out of egress interface 404 toward network device 202(2).

In one example, application 406 may generate a packet that is destined for the other application running in user space on network device 202(2). The packet may include a first header that identifies network device 202(2) as the destination. In this example, socket-intercept layer 112 running in operating system kernel 410 may hijack and/or intercept the packet on its way to packet forwarding engine 104(1). Upon hijacking and/or intercepting the packet, socket-intercept layer 112 may query routing daemon 108 in user space on routing engine 102(1) for the MTU value of egress interface 404. Socket-intercept layer 112 may record the MTU value of egress interface 404 as metadata (e.g., in a control message or "CMSG" header) within the packet. Socket-intercept layer 112 may then pass the packet to tunnel driver 114 in operating system kernel 410.

Upon receiving the packet, tunnel driver 114 may identify and/or determine the size of the packet. Tunnel driver 114 may also identify and/or determine the MTU of egress interface 404 by checking and/or analyzing the metadata of the packet. For example, tunnel driver 114 may determine that the size of the packet is 9000 bytes and the MTU of egress interface 404 is 1500 bytes. Accordingly, tunnel driver 114 may determine that the 9000-byte packet exceeds the 1500-byte MTU of egress interface 404.

As illustrated in FIG. 4, network device 202(1) may also include an internal interface 402 that facilitates communication between routing engine 102(1) and packet forwarding engine 104(1). In one example, internal interface 402 may have an MTU of 9000 bytes, which is consistent with the size of the packet. As a result, without any fragmentation, the packet may be able to traverse internal interface 402 from routing engine 102(1) to packet forwarding engine 104(1). However, since the MTU of egress interface 404 is 1500 bytes, packet forwarding engine 104(1) may be unable to forward the packet to network device 202(2) by way of egress interface 404 unless the packet is first fragmented into smaller segments.

Unfortunately, packet forwarding engine 104(1) may be unable to perform fragmentation on the packet. Instead, operating system kernel 410 may be responsible for fragmenting packets into smaller segments, if necessary, to comply with the MTUs of network interfaces (such as egress interface 404). Packet forwarding engine 104(1) may simply forward packets and/or their constituent segments to their destinations provided that such packets and/or segments do not exceed the MTU of the corresponding egress interfaces.

Returning to the earlier example, in response to determining that the 9000-byte packet exceeds the 1500-byte MTU of egress interface 404, tunnel driver 114 may fragment the packet into multiple segments that each include 1500 bytes or less such that each segment complies with the MTU of egress interface 404. In this example, each segment may include a copy of the first header that identifies network device 202(2) as the destination. Tunnel driver 114 may also add a second header to each segment. This second header may direct each segment to packet forwarding engine 104(1) for forwarding.

Continuing with this example, tunnel driver 114 may record the MTU value of egress interface 404 in a socket buffer of the socket that facilitates communication between application 406 and the other application (not illustrated in FIG. 4) that is running on network device 202(2). This record of the MTU value of egress interface 404 may enable socket-interface layer 112 to bypass the query to routing daemon 108 in connection with subsequent packets that are destined for the other application running on network device 202(2).

After the addition of the second header to each segment, operating system kernel 410 may determine that these segments are heading to packet forwarding engine 410 based at least in part on the second header. Upon making this determination, operating system kernel 410 may pop the second header from the segments and then forward the segments to packet forwarding engine 104(1) via internal interface 402. In turn, packet forwarding engine 104(1) may forward all the segments to network device 202(2) by way of egress interface 404. Accordingly, each segment may egress out of network device 202(1) toward network device 202(2) via egress interface 404.

Figure 5:
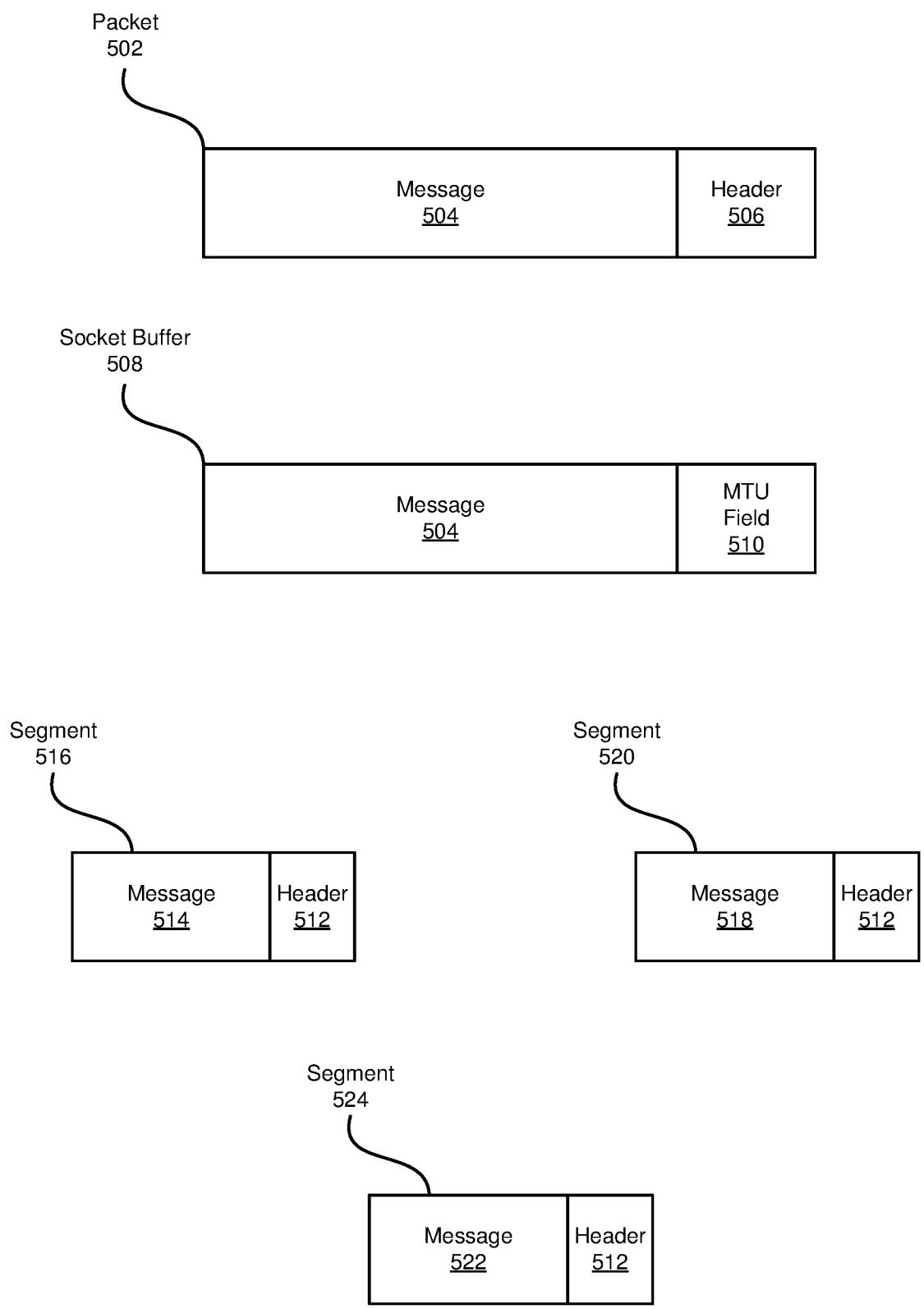
FIG. 5 is an illustration of an exemplary packet, an exemplary socket buffer, and exemplary segments fragmented from the packet.

FIG. 5 illustrates an exemplary packet 502, an exemplary socket buffer 508, and exemplary segments 516, 520, and 524. In one example, socket-intercept layer 112 may receive and/or intercept packet 502, which includes a message 504 and is destined to egress out of egress interface 404 toward network device 202(2). In this example, socket-intercept layer 112 may query routing daemon 108 for the MTU value of egress interface 404. Upon obtaining that MTU value from routing daemon 108, socket-intercept layer 112 may add metadata 506 to packet 502. In this example, metadata 506 may include and/or represent a control message or "CMSG" that identifies the MTU value of egress interface 404 as 1500 bytes.

Continuing with this example, socket-intercept layer 112 may push and/or pass packet 502 to tunnel driver 114. Upon receiving packet 502, tunnel driver 114 may determine that message 504 includes 9000 bytes. Tunnel driver 114 may also determine that the MTU of egress interface 404 is only 1500 bytes based at least in part on metadata 506. To ensure that packet 502 complies with the MTU of egress interface 404, tunnel driver 114 may fragment packet 502 into segments 516, 520, and 524.

In this example, segments 516, 520, and 522 may include messages 514, 518, and 522, respectively. Messages 514, 518, and 522 may represent message segments that collectively include the same data and/or information as message 504. Accordingly, segments 516, 520, and 522 may collectively carry and/or convey the same payload as packet 502.

In addition, tunnel driver 114 may record the MTU value of egress interface 404 (as represented in metadata 506) into an MTU field 510 within socket buffer 508. In this example, by storing the MTU value of egress interface 404 in this way, MTU field 510 may enable socket-interface layer 112 to bypass the query to routing daemon 108 in connection with subsequent packets that are destined to egress out of egress interface 404.

In one example, tunnel driver 114 may add a copy of header 512 to each of segments 516, 520, and 524. In this example, header 512 may indicate that segments 516, 520, and 524 need to be directed to packet forwarding engine 104(1) via internal interface 402.

Figure 6:
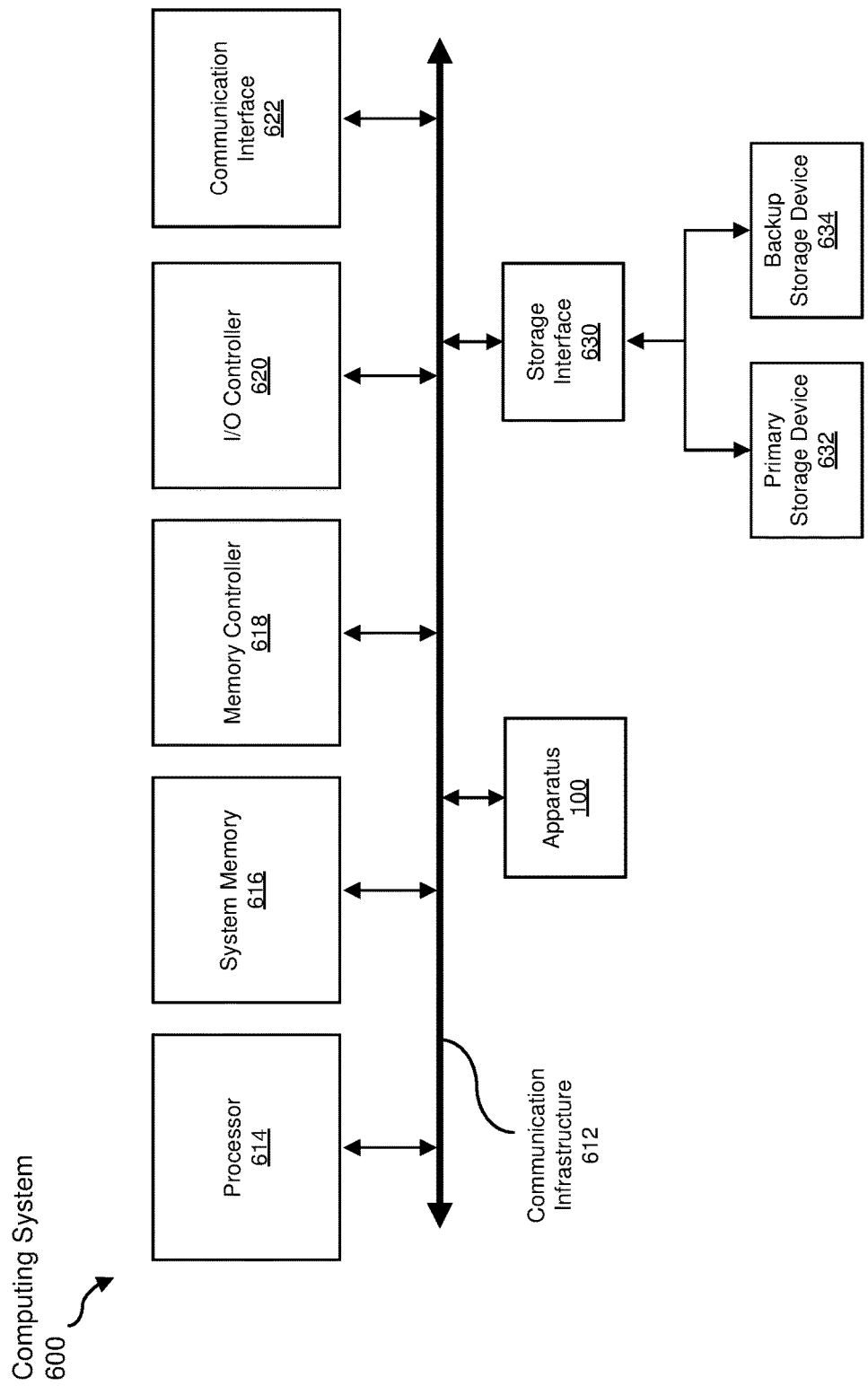
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include apparatus 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    binding an application in user space on a network device to a tunnel driver in kernel space on the network device to create a socket that facilitates communication between the application and another application on a remote device;
    intercepting, via a socket-intercept layer in kernel space on the network device, a packet that:
        originated from the application in user space on the network device; and
        is destined for the remote device;
    in response to intercepting the packet in kernel space:
        querying, by the socket-intercept layer, a routing daemon in user space on the network device for a maximum transmission unit value of an egress interface that is to forward the packet from the network device to the remote device; and
        recording, by the socket-intercept layer, the maximum transmission unit value of the egress interface as metadata within the packet;
    passing the packet to the tunnel driver for fragmentation prior to being forwarded to the remote device by way of the egress interface;
    identifying, by the tunnel driver, a size of the packet;
    determining, by the tunnel driver, that the size of the packet exceeds the maximum transmission unit value of the egress interface;
    in response to determining that the packet exceeds the maximum transmission unit value of the egress interface, fragmenting, by the tunnel driver, the packet into segments whose respective sizes each comply with the maximum transmission unit value of the egress interface; and
    forwarding the segments of the packet to the remote device by way of the egress interface.

2. The method of claim 1, wherein fragmenting the packet into the segments comprises calling, by the tunnel driver, a fragmentation routine that fragments the packet into the segments based at least in part on the maximum transmission unit value.

3. The method of claim 1, further comprising:
    upon fragmenting the packet into the segments, pushing the segments of the packet to a packet forwarding engine on the network device; and
    wherein forwarding the segments of the packet to the remote device comprises forwarding, by the packet forwarding engine, the segments of the packet to the remote device by way of the egress interface.

4. The method of claim 3, further comprising adding, by the tunnel driver, a header to each of the segments of the packet to direct the segments of the packet to the packet forwarding engine for forwarding to the remote device.

5. The method of claim 3, further comprising:
    identifying a maximum transmission unit value of an internal interface between a routing engine on the network device and the packet forwarding engine;
    determining that the maximum transmission unit value of the internal interface is greater than the maximum transmission unit value of the egress interface; and
    in response to determining that the maximum transmission unit value of the internal interface is greater than the maximum transmission unit value of the egress interface, fragmenting the packet such that the size of each segment is less than or equal to the maximum transmission unit value of the egress interface irrespective of the maximum transmission unit value of the internal interface.

6. The method of claim 1, further comprising recording the maximum transmission unit value of the egress interface in a socket buffer of the socket that facilitates communication between the application and another application on the remote device.

7. The method of claim 6, further comprising:
receiving, from the application, another packet that is destined for the remote device;
identifying the record of the maximum transmission unit value of the egress interface in the socket buffer of the socket;
determining that the size of the other packet exceeds the maximum transmission unit value of the egress interface;
fragmenting, based at least in part on the record of the maximum transmission unit identified in the socket buffer, the other packet into other segments whose respective sizes each comply with the maximum transmission unit value; and
forwarding the other segments of the other packet to the remote device by way of the egress interface.

8. A system comprising:
a hardware routing engine that comprises:
an application in user space that binds to a tunnel driver in kernel space to create a socket that facilitates communication between the application and another application on a remote device;
a socket-intercept layer, stored in kernel space, that:
intercepts a packet that:
originated from the application in user space; and
is destined for the remote device;
queries, in response to intercepting the packet in kernel space, a routing daemon in user space for a maximum transmission unit value of an egress interface that is to forward the packet from the network device to the remote device;
records the maximum transmission unit value of the egress interface as metadata within the packet; and
passes the packet to the tunnel driver for fragmentation prior to being forwarded to the remote device by way of the egress interface;
wherein the tunnel driver:
identifies a size of the packet;
determines that the size of the packet exceeds the maximum transmission unit value of the egress interface; and
in response to determining that the packet exceeds the maximum transmission unit value of the egress interface, fragments the packet into segments whose respective sizes each comply with the maximum transmission unit value of the egress interface; and
a hardware packet forwarding engine that forwards the segments of the packet to the remote device by way of the egress interface.

9. The system of claim 8, wherein the tunnel driver calls a fragmentation routine that fragments the packet into the segments based at least in part on the maximum transmission unit value.

10. The system of claim 8, wherein the tunnel driver pushes the segments of the packet to the hardware packet forwarding engine upon fragmenting the packet into the segments.

11. The system of claim 10, the tunnel driver adds a header to each of the segments of the packet to direct the segments of the packet to the hardware packet forwarding engine for forwarding to the remote device.

12. The system of claim 10, wherein the tunnel driver:
identifies a maximum transmission unit value of an internal interface between the hardware routing engine on the network device and the hardware packet forwarding engine;
determines that the maximum transmission unit value of the internal interface is greater than the maximum transmission unit value of the egress interface; and
fragments, in response to determining that the maximum transmission unit value of the internal interface is greater than the maximum transmission unit value of the egress interface, the packet such that the size of each segment is less than or equal to the maximum transmission unit value of the egress interface irrespective of the maximum transmission unit value of the internal interface.

13. The system of claim 8, wherein the tunnel driver records the maximum transmission unit value of the egress interface in a socket buffer of the socket that facilitates communication between the application and another application on the remote device.

14. A network device comprising:
a hardware routing engine that comprises:
an application in user space that binds to a tunnel driver in kernel space to create a socket that facilitates communication between the application and another application on a remote device;
a socket-intercept layer, stored in kernel space, that:
intercepts a packet that:
originated from the application in user space; and
is destined for the remote device;
queries, in response to intercepting the packet in kernel space, a routing daemon in user space for a maximum transmission unit value of an egress interface that is to forward the packet from the network device to the remote device;
records the maximum transmission unit value of the egress interface as metadata within the packet; and
passes the packet to the tunnel driver for fragmentation prior to being forwarded to the remote device by way of the egress interface;
a tunnel driver, stored in kernel space, that:
identifies a size of the packet;
determines that the size of the packet exceeds the maximum transmission unit value of the egress interface; and
in response to determining that the packet exceeds the maximum transmission unit value of the egress interface, fragments the packet into segments whose respective sizes each comply with the maximum transmission unit value of the egress interface; and
a hardware packet forwarding engine that forwards the segments of the packet to the remote device by way of the egress interface.

* * * * *